(12) United States Patent
Chen

(10) Patent No.: US 8,099,742 B2
(45) Date of Patent: Jan. 17, 2012

(54) OPTICAL DISK LOADING FINAL POSITION DETECTION DEVICE

(76) Inventor: Yung Ta Chen, Guangdong (CN)

(*) Notice: Subject to any disclaimer, the term of this patent is extended or adjusted under 35 U.S.C. 154(b) by 375 days.

(21) Appl. No.: 12/422,008

(22) Filed: Apr. 10, 2009

(65) Prior Publication Data

US 2010/0095314 A1 Apr. 15, 2010

(30) Foreign Application Priority Data

Oct. 15, 2008 (CN) .......................... 2008 1 0216854

(51) Int. Cl.
*G11B 17/03* (2006.01)

(52) U.S. Cl. ......... 720/620; 720/600; 720/624; 720/656

(58) Field of Classification Search .................. 720/600, 720/620, 656

See application file for complete search history.

(56) References Cited

U.S. PATENT DOCUMENTS 6,661,764 B2 * 12/2003 Hino et al. .................... 720/656
7,162,725 B2 * 1/2007 Yoshimura et al. ........... 720/620

FOREIGN PATENT DOCUMENTS

JP          2006302476  A  * 11/2006

* cited by examiner

*Primary Examiner* — Hoai V Ho
*Assistant Examiner* — Pablo Huerta
(74) *Attorney, Agent, or Firm* — Jackson IPG PLLC; Demian K. Jackson

(57) ABSTRACT

An optical disk loading final position detection device includes an optical disk guiding device, a delivery roll, a pair of detection bars provided with detection parts capable of freely rotating around respective rotary pivots, a support part, the middle of the support part being provided with an assorted part interacting with the detection bar, and a trigger bar. One end of the trigger bar is provided with a contact part for contacting the periphery of an optical disk, and the other end being connected to a control part. When the detection bars are rotating, the support part makes the trigger bar move towards the direction directly facing the central line, so, the trigger bar will not extrude out of the maximum outer diameter of the optical disk along the optical disk transport direction, so as to implement miniaturizing the optical disk playing device.

5 Claims, 13 Drawing Sheets

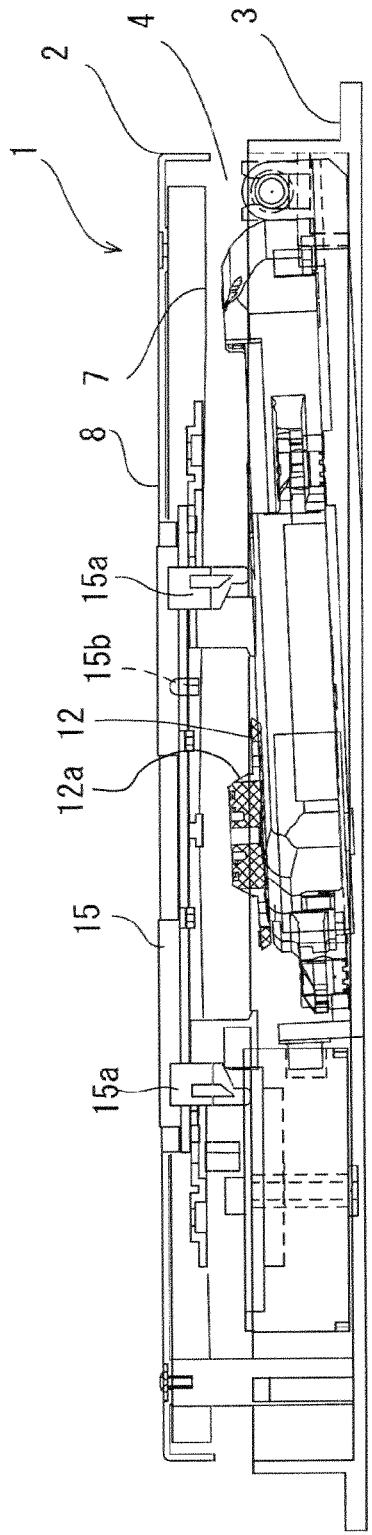
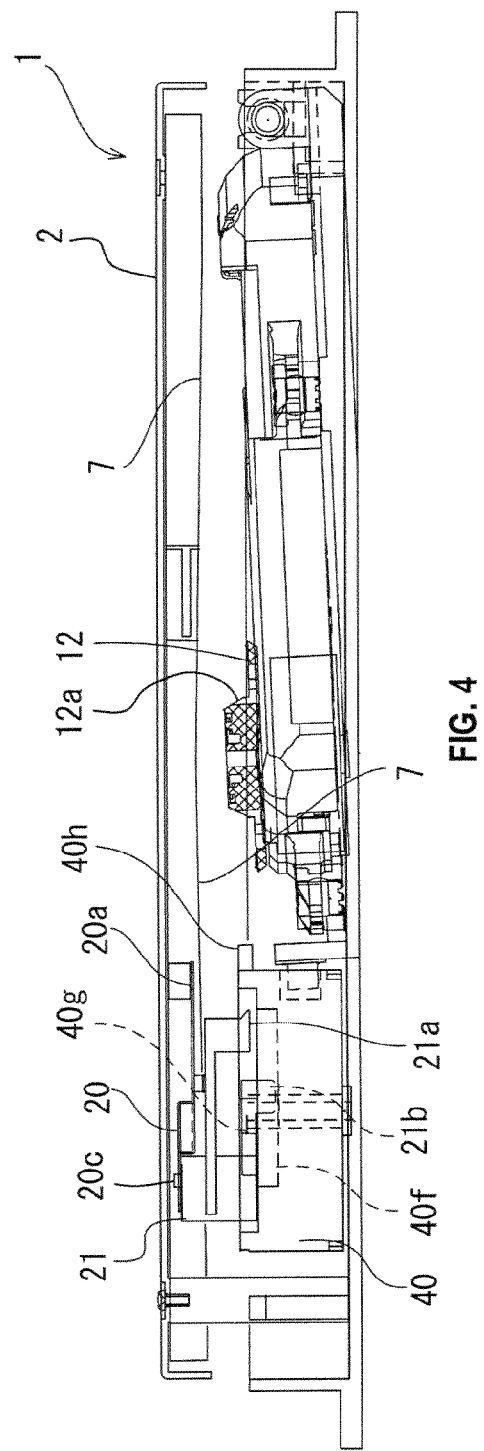
FIG. 3
FIG. 4

OPTICAL DISK LOADING FINAL POSITION DETECTION DEVICE

BACKGROUND OF THE INVENTION

1. Field of the Invention

The present invention involves the optical disk position detection device of an optical disk playing device, specifically involves an optical disk loading final position detection device which detects whether the center of an optical disk of big or small diameter inserted from the insertion inlet is transported to the position in accord with the center of the plummer or not.

2. Description of the Related Art

The Japanese patent application with the publication number of 2006-302476 disclosed an optical disk loading final position detection device, which can detect whether the center of an optical disk of big or small diameter is transported to the position in accord with the center of the plummer or not. The optical disk loading final position detection device has the following structure: a delivery roll is located at the optical disk insertion inlet; an optical disk guiding device is located at the position opposite to the delivery roll; a pair of detection bars are provided, which have detection parts contacting the periphery of the optical disks of big diameter or small diameter inserted from the insertion inlet, and the detection parts rotate towards the direction away from the optical disk insertion path; a trigger bar is provided, and as the optical disk is held by the delivery roll and transported by the rotating of the delivery roll, when the center of the optical disk approaches the center of the plummer, the contact stud of the trigger bar contacts the periphery of the optical disk and rotates; a control panel is provided, which is stirred by the trigger bar to start to transport the power of the motor and move.

In the above mentioned optical disk loading final position detection device, the support part that moves together with the detection bars is located on the base plate, and it can freely move along the transport direction of the optical disk. The support part is approximately connected at the central position of the trigger bar. So, when the trigger bar contacts the periphery of the optical disk and rotates, the support part moves along the transport direction of the optical disk, to make the trigger bar to rotate around the contact part where it contacts the control panel. By the rotating of the trigger bar, the contact stud located at the front end of the trigger bar will contact the periphery of the optical disk at the position corresponding to the outer diameter of the optical disk loaded.

In the above mentioned optical disk loading final position detection device, for the detection bars will rotate for a vast scale when the optical disk of big diameter is loaded, the support part will also move for a vast scale along the transport direction of the optical disk. So, the rotary displacement of the trigger bar will get big, and the contact stud will move for a vast scale along the transport direction of the optical disk, which is not good for miniaturizing the optical disk playing device. For example, when the product casing is made to be as big as or smaller than the maximum diameter of the optical disk, then the optical disk playing device contained in the case is at least smaller than the maximum outer diameter of the optical disk. By this time, if the contact stud is made to move along the transport direction of the optical disk, the contact stud will extrude to the position out of the maximum outer diameter along the transport direction of the optical disk, which is not desirable.

SUMMARY OF THE INVENTION

The technical problem for the present invention to solve is to provide an optical disk loading final position detection device; adopting the optical disk loading final position detection device can implement miniaturizing the optical disk playing device.

To solve the above mentioned technical problem, the optical disk loading final position detection device of the present invention comprises:

at least one optical disk guiding device located at the optical disk insertion inlet;

a delivery roll located at the optical disk insertion inlet and located at the position opposite to the optical disk guiding device;

a pair of detection bars provided with detection parts contacting the periphery of the optical disk of big diameter or small diameter inserted from the optical disk insertion inlet, and the detection bars being capable of freely rotating around respective rotary pivots;

characterized in that it also comprises:

a support part, one end of the support part being rotatably fixed to the upper base plate near the detection part of one detection bar, the middle of the support part being provided with an assorted part interacting with the detection bar; and a trigger bar, the middle of the trigger bar being rotatably fixed to the free end of the support part, one end of the trigger bar being provided with a contact part for contacting the periphery of an optical disk, and the other end being connected to a control part. When the optical disk is held and transported by the delivery roll and optical disk guiding device to approach the central position of the plummer, the periphery of the optical disk contacts the contact part of the trigger bar, so, the trigger bar will rotate.

The control part can adopt the following structure; the control part is a cam unit capable of rotating freely around its shaft; the cam unit is provided with:

a gear ring located at an edge position of the periphery of the cam unit, the gear ring being provided with a gap;

a circular-arc groove located at the end part of the cam unit, being used to interact with the trigger bar;

a second salience located at the periphery of the cam unit, being used to stir the detection bars to rotate to release the contact of the detection parts and the periphery of a small diameter optical disk; and a third salience located at the periphery of the cam unit, being used to stir the detection bars to rotate to release the contact of the detection parts and the periphery of a big diameter optical disk.

The periphery of the cam unit is also provided with a first flange for controlling a chuck plate to approach or be away from the optical disk transport path, a second flange for controlling the plummer to approach or be away from the optical disk transport path, and a third flange for controlling the delivery roll to approach or be away from the optical disk guiding device.

In the present invention, the trigger bar is connected to one end of the support part by way of rotating shaft support, which is rotatable, and the other end of the support part is connected to the base plate by way of rotating shaft support, which can rotate freely, and the central part of the support part is provided with an assorted part to interact with the detection bars. While the detection bars are rotating, the support part makes the trigger bar to move towards the direction directly facing the central line, so, the trigger bar will not extrude out of the maximum outer diameter of the optical disk along the optical disk transport direction, so as to implement miniaturizing the optical disk playing device.

BRIEF DESCRIPTION OF THE DRAWINGS

FIGS. 3-6 are separately sectional views of different positions in the transport device;

DESCRIPTION OF THE PREFERRED EMBODIMENTS

In the present invention, the trigger bar is connected to one end of the support part by way of rotating shaft support, and the other end of the support part is connected to the upper base plate by way of rotating shaft support, which can rotate freely, and the central part of the support part is provided with an assorted part to interact with the detection bars. Aspects of the present invention is best understood from the following detailed description when read with reference to the accompanying figures.

Figure 1:
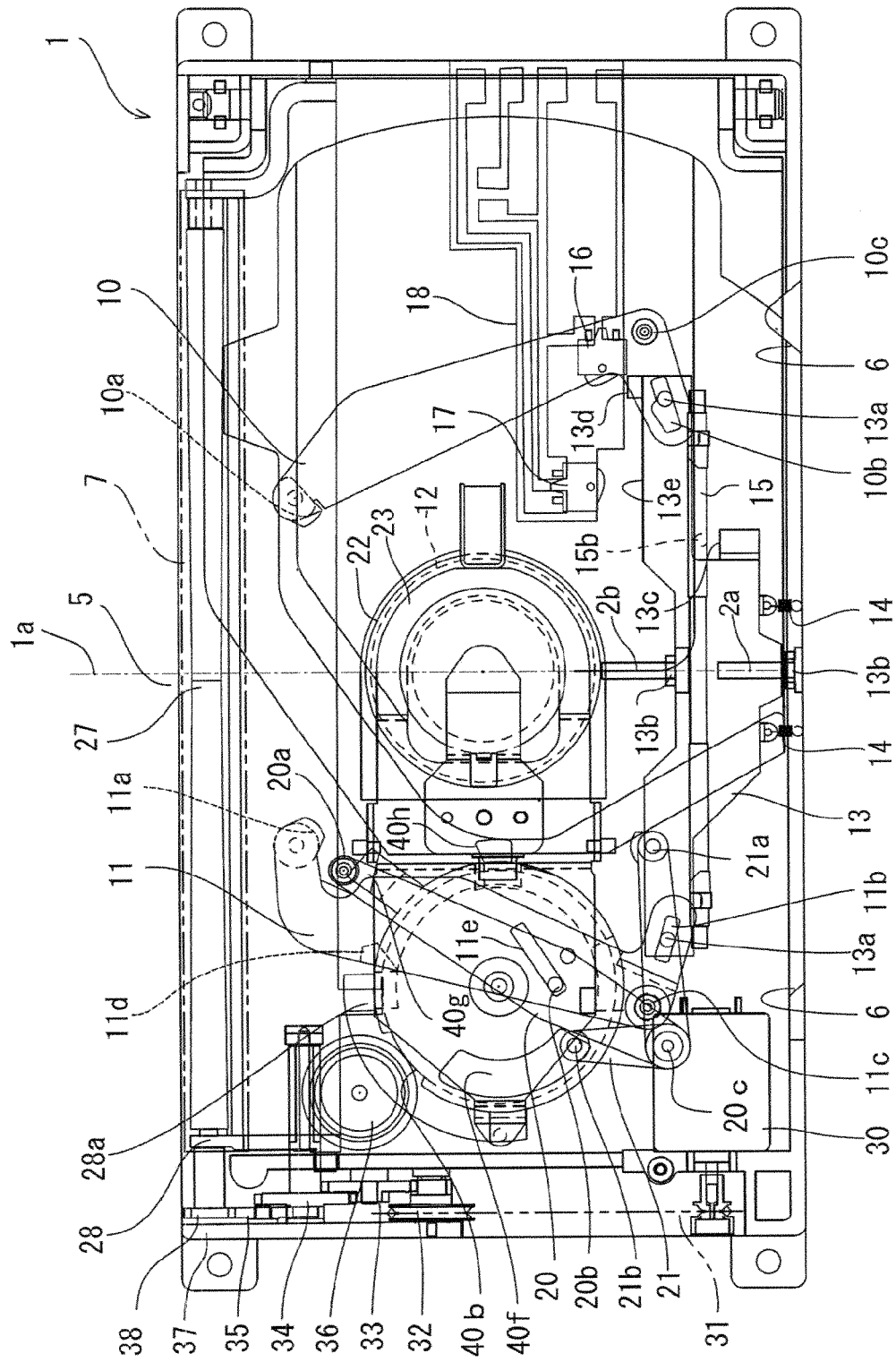
FIG. 1 is a plan view of an optical disk playing device provided with the optical disk loading final position detection device of the present invention.

FIG. 1 is a plan view of a playing device provided with the optical disk loading final position detection device of the present invention. Referring to FIGS. 1-7, the main unit 1 of the optical disk playing device comprises an upper base plate 2 and a lower base plate 3, and the upper, lower base plates are connected as one body via components such as screws. Besides, a clearance 4 is located between the upper base plate 2 and the lower base plate 3; the side of one end of the upper base plate 2 and the lower base plate 3 is provided with an optical disk insertion inlet 5, and the other side is provided with a big diameter optical disk baffle 6. The upper base plate 2 and the lower base plate 3 are only 84 millimeters wide in the direction that the optical disk is inserted, which is smaller than the outer diameter of the big diameter optical disk (the outer diameter of the big diameter optical disk is 12 centimeters). The edge of the optical disk insertion inlet 5 of the upper base plate 2 is provided with an optical disk guiding device 7, and the optical disk guiding device 7 is made of synthetic resin; its structure is a bipyramidal structure with the diameter gradually increasing from the middle to the two ends; while holding an optical disk, it only contacts the periphery of the optical disk, so as to avoid producing scratches on the surface of the optical disk; it is fixed on the upper base plate 2 via a metal cover plate 8. Besides, in FIG. 1, almost all the components are contained in the inside the base plates; according to the rules, these components should be described with broken line, but because broken line is not clear enough, so they are described with thin real line.

Figure 8:
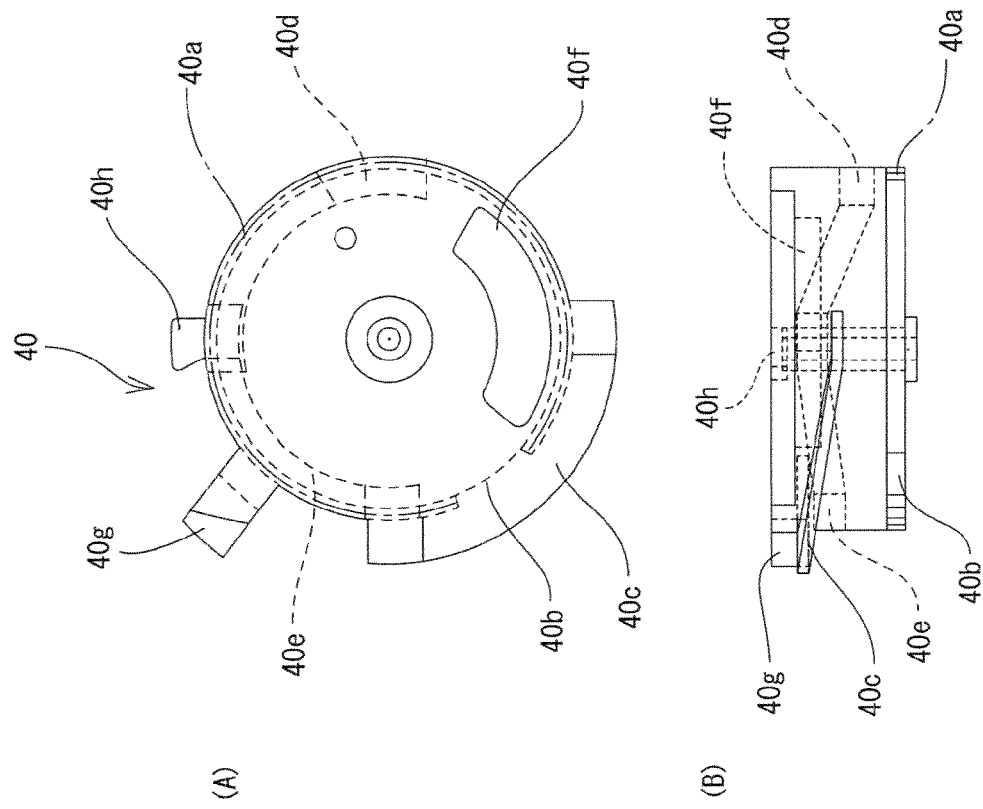
FIGS. 8A and 8B are separately top view and side view of the cam unit.

The detection bars contacting the periphery of the optical disk inserted and being capable of rotating are fixed on the upper base plate 2. A central line 1a is at the optical disk transport direction of the main unit 1; the detection bars comprise a right detection bar 10 located at the right of the central line 1a and a left detection bar 11 located at the left of the central line 1a. The two detection bars 10, 11 are provided with long arms and short arms, which are of L shape; the front end of the long arms are provided with detection parts 10a, 11a contacting the periphery of the optical disk, and the front end of the short arms are provided with the first slotted holes 10b, 11b; the curved parts of the L shape are the rotary pivots 10c, 11c. The detection parts 10a, 11a of the two detection bar 10, 11 are located between the delivery roll 27 and the plummer 12 on the lower base plate 3; at the initial position, the space between the two detection parts 10a, 11a is a little smaller than the diameter of the small diameter optical disk. A salient foot part 11d is located on the left detection bar 11 towards the lower base plate 3. According to the rotating position, the foot part 11d can selectively meshes with the second salience 40h and the third salience 40g on the cam unit 40 (namely the control part 40) shown in FIG. 8, so as to release the contact of the detection parts 10a, 11a and the periphery of the optical disk.

Figure 2:
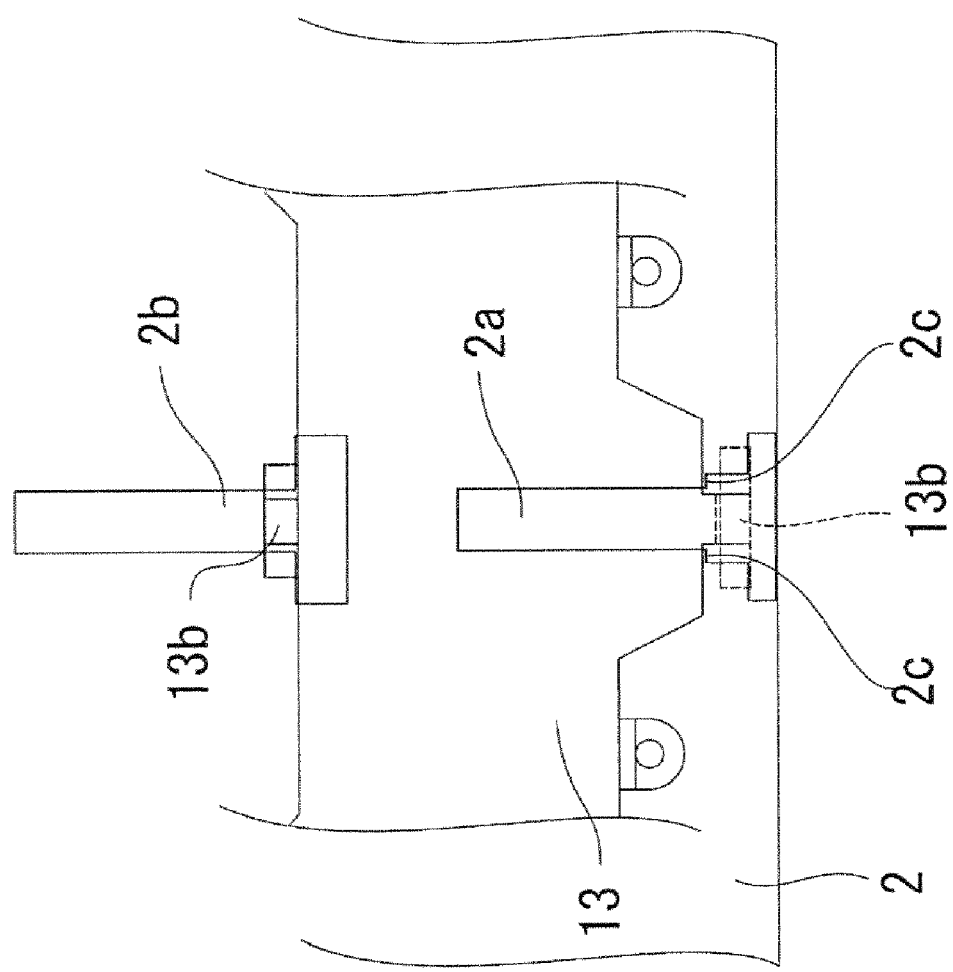
FIG. 2 is an enlarged view about the relation of the linkage plate and the upper base plate.

An linkage plate 13 capable of freely moving at the direction parallel to the optical disk transport path is fixed on the upper base plate 2, and the two end parts of the linkage plate 13 are provided with the first saliencies 13a capable of cooperating with the first slotted holes 11b, 10b of the left and right two detection bars 11,10. Moreover, the first guiding hole 2a and the second guiding hole 2b are located on the upper base plate 2, so as to make the linkage plate 13 to move in parallel according to the optical disk transport path. Embedding parts 13b capable of being separately embedded to the two guiding holes 2a, 2b are located at the central part of the linkage plate 13. Referring to FIG. 2, the width of the one end part of the first guiding hole 2a is a little bigger than the width of the embedding part 13b on the linkage plate 13, and the step parts 2c are formed at the inner side of the first guiding hole 2a. So, if the linkage plate 13 wants to do initial movement at heeling condition, the embedding parts 13b will contact the step parts 2c, so as to limit the initial movement of the linkage plate 13. The first stretching spring 14 is hung between the linkage plate 13 and the upper base plate 2. For the first stretching spring 14 ordinarily stretches the linkage plate 13 to the downward direction in FIG. 1, the two detection bars 10, 11 will endure the spring force of the first stretching spring 14 via the linkage plate 13, to make the detection parts 10a, 11a being in the trend of getting closer to each other.

Figure 15:
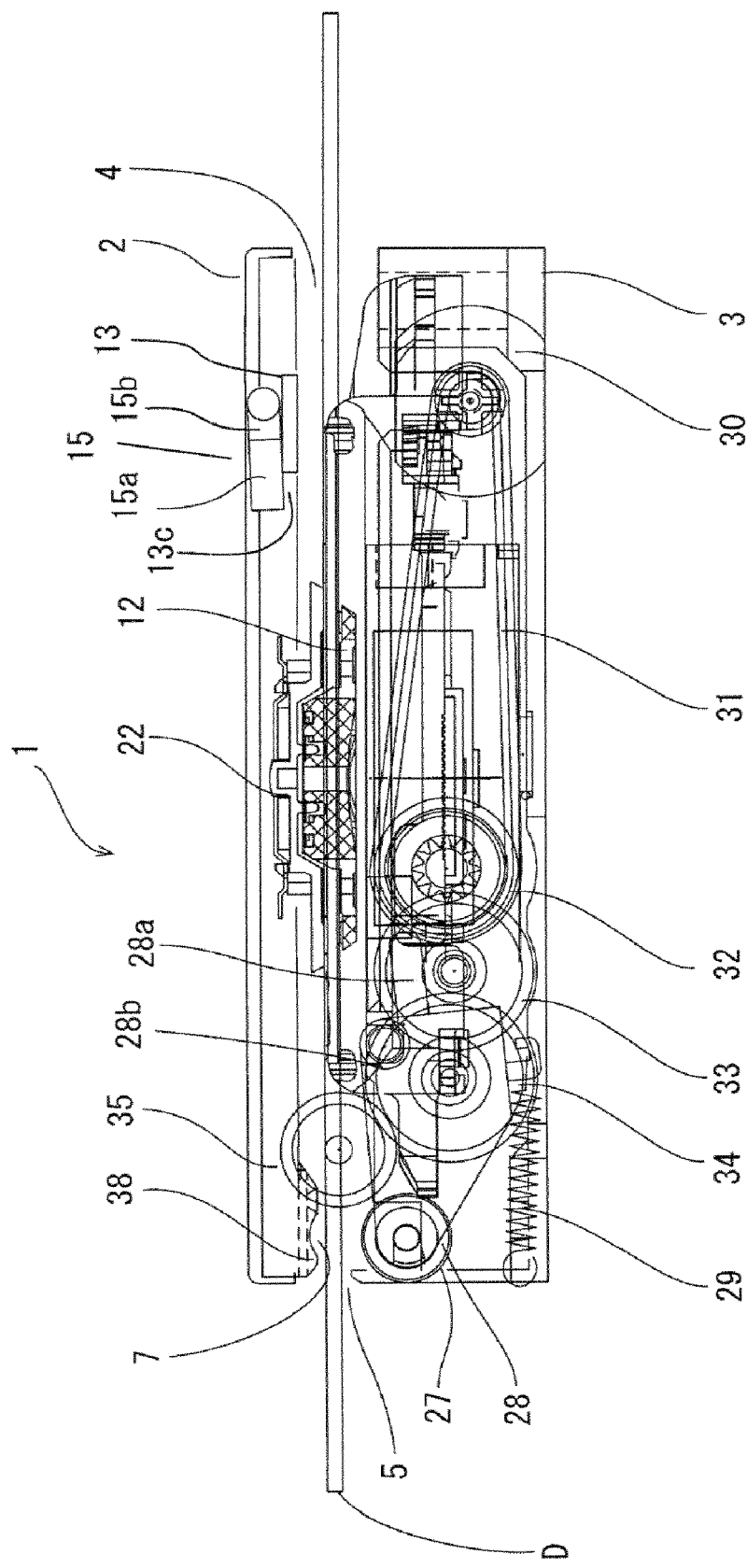
FIG. 15 is a side view of a big diameter optical disk at the state of being played.

Besides, the linkage plate 13 is provided with the first pushing part 13c. When the movement of the linkage plate 13 is bigger than the initial position, as shown in FIG. 15, the first pushing part 13c will cooperate with the optical disk baffle 15 making the transport of small diameter optical disk to be at the stop position, so as to make the baffle part 15a of the optical disk baffle 15 to exit from the optical disk transport path. The optical disk baffle 15 is a long and thin clubbed part, which is fixed on the upper base plate 2, and is perpendicular to the central line 1a. Referring to FIG. 3, before the optical disk is inserted, the baffle part 15a extends into the optical disk transport path 4. The position of the baffle part 15a is set to make it to contact the periphery of the small diameter optical disk when the center of the small diameter optical disk just passes the center of the plummer a little. Furthermore, a pushed part 15b contacting the first pushing part 13c of the linkage plate 13 is located on the optical disk baffle 15. Besides, the linkage plate 13 is also provided with the second pushing part 13d and the third pushing part 13e; when the linkage plate moves from the initial position, the second pushing part 13d will make the first switch 16 for starting the motor to act, and the third pushing part 13e will make the second switch 17 for judging the outer diameter of the inserted optical disk to act. The first switch 16 and second switch 17 are fixed on the upper base plate 2 via a PCB 18.

A support part 20 made of thin metal slice is fixed on the upper base plate 2 at the position that coincides with the left detection bar 11. One end of the support part 20 to be capable of freely rotating is fixed on the upper base plate 2 near the detection part 11a of the left detection bar 11 via the first short axis 20a, and the other end is fixed to the trigger bar 21 via the second short axis 20c; the trigger bar 21 can freely rotate around the second short axis 20c. The support part 20 is fixed on the upper base plate 2, and is located at the direction that makes the connecting line between the first short axis 20a and the second short axis 20c to be juxtaposed to the central line 1a. Furthermore, the middle position of the support part 20 is provided with an assorted part 20b (here a salient point is adopted) to interact with the second slotted hole 11e of the left detection bar 11; the salient point 20b is embedded in the second slotted hole 11e and can move in the second slotted hole. The trigger bar 21 is a part of L shape, and it is fixed to the second short axis 20c of the support part 20 via the curved part; one of the end parts is provided with a contact part 21a contacting the periphery of the optical disk, and the other end part is provided with a contact pin 21b contacting the end face of the circular-arc groove 40f of the cam unit 40. So, under the action of the spring force (the spring is not shown in the figure), the trigger bar 21 gives the second short axis 20c a rotating force towards the center, to push the contact pin 21b towards the end face of the circular-arc groove 40f of the cam unit 40.

Figure 5:
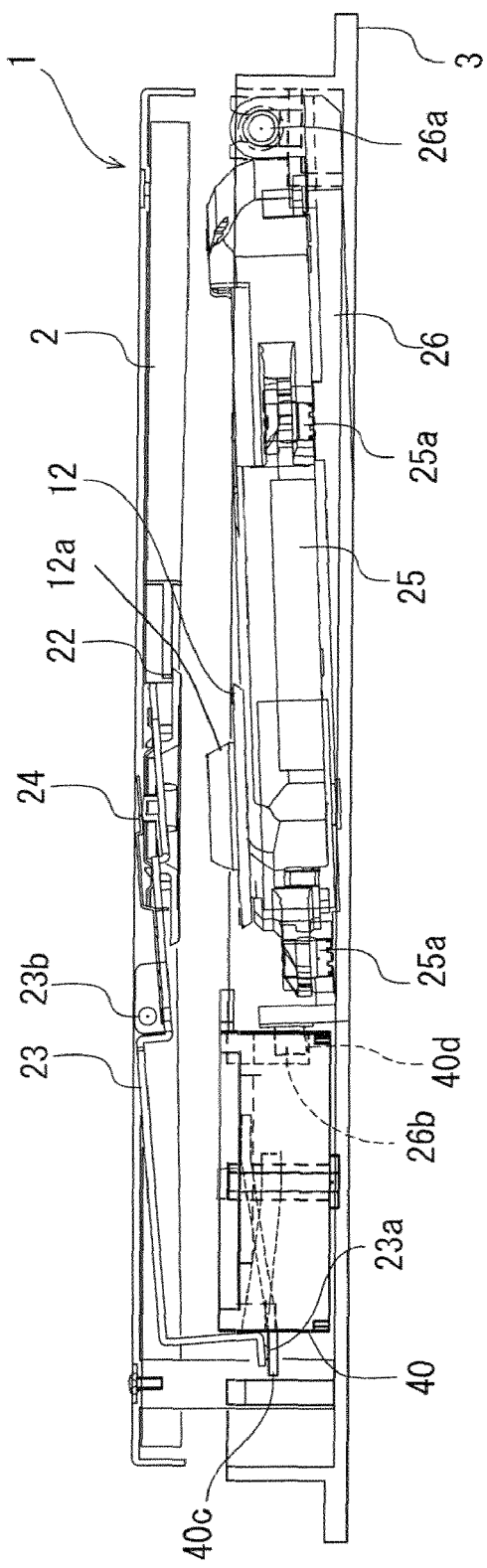

Besides, referring to FIG. 5, the upper base plate 2 is provided with a hold plate 23 to hold the chuck plate 22. One end of the hold plate 23 is provided with the chuck plate 22; the other end is provided with the first slide contact part 23a cooperating with the first flange 40c of the cam unit 40; the middle part is provided with a connecting part 23b; the hold plate 23 is connected to the upper base plate 2 via the connecting part 23b, and can freely rotate around the connecting part 23b. Moreover, the hold plate 23 is provided with a hold plate elastic slice 24 pushing the center of the chuck plate 22 towards the plummer 12. A spring (the spring is not shown in the figure) is fixed between the hold plate 23 and the upper base plate 2; the spring can make the hold plate 23 to rotate, so as to make the chuck plate 22 to endure the force of separating from the plummer 12. If the cam unit 40 rotates from the initial position, the first flange 40c will endure the force of the spring (the spring is not shown in the figure) to make the hold plate 23 to rotate, further to connect the chuck plate 22 and the plummer 12.

Figure 6:
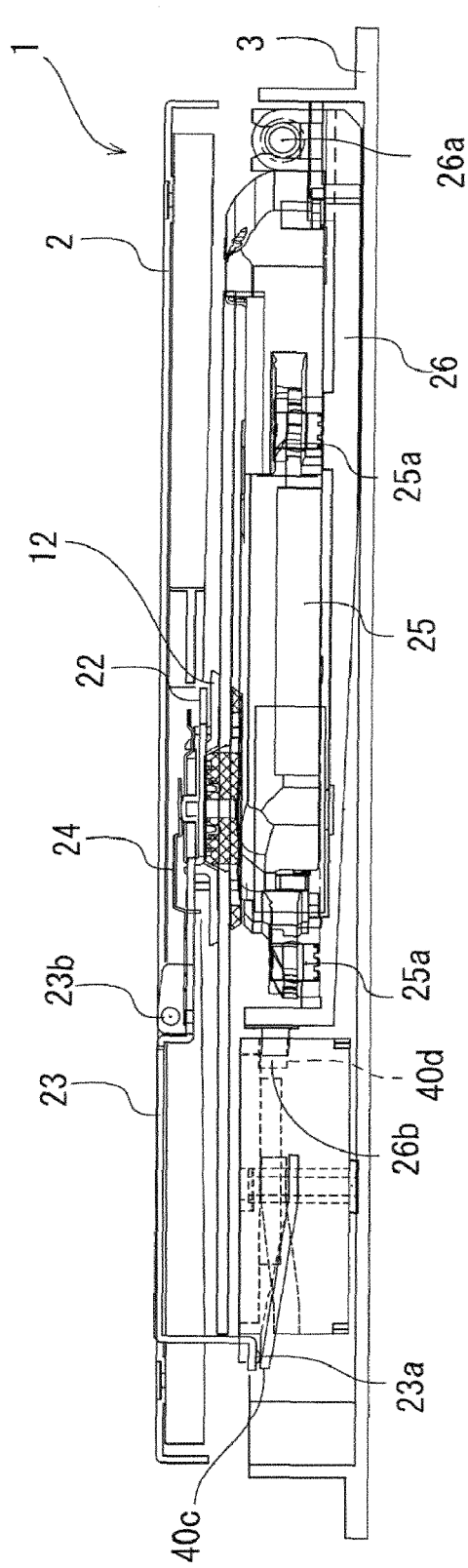

The lower base plate 3 is provided with a PU base plate 26; the PU base plate 26 can freely rotate around its shaft 26a, and is provided with a rotating mechanism 25 for playing optical disks. The rotating mechanism 25 is an integrative part comprising the plummer 12 rotating the optical disk and the optical disk signal pickup device, and it is fixed to the PU base plate 26 via a shockproof elastic part 25a. Referring to FIG. 5, the shaft 26a at one end of the PU base plate 26 is supported on the lower base plate 3, and the other end is provided with the second slide contact part 26b cooperating with the second flange 40d of the cam unit 40. Besides, when the cam unit 40 is at the initial position, the second flange 40d makes the other end of the PU base plate 26 to approach the lower base plate 3, so as to make the plummer 12 to be far away from the optical disk transport path 4. Referring to FIG. 6, when the second flange 40d is located at the rotating end terminal of the cam unit 40, the plummer 12 is located in the optical disk transport path 4.

Figure 7:
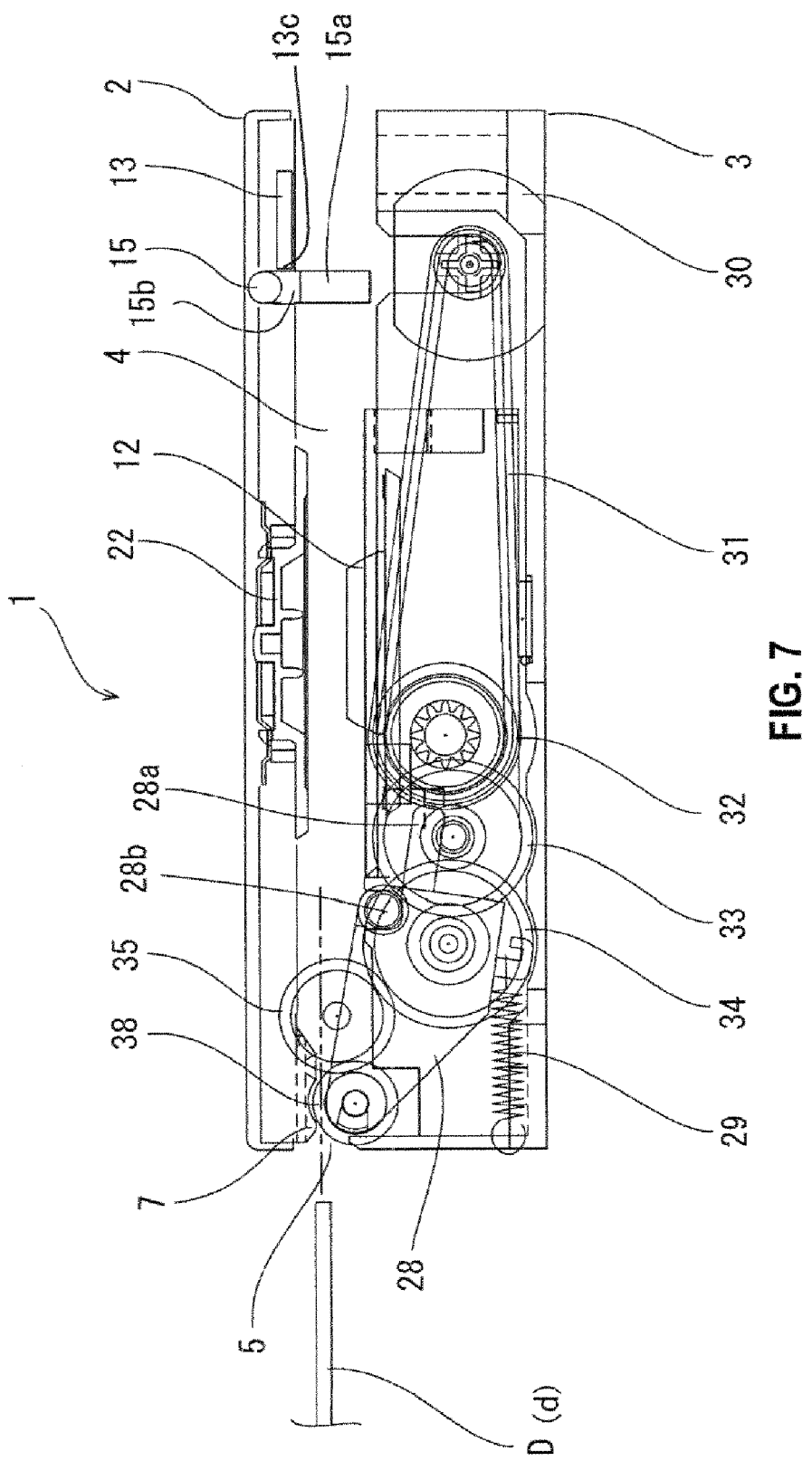
FIG. 7 is a sectional view of the side of the transport device.

Referring to FIG. 7, a roll support plate 28 for supporting the delivery roll 27 and making it capable of freely rotating is fixed on the lower base plate 3 via the shaft 28b, and it can freely rotate. The roll support plate 28 makes the delivery roll 27 to be located at the position opposite to the optical disk guiding device 7. Besides, the second stretching spring 29 is hung between the roll support plate 28 and the lower base plate 3; under the action of the force of the second stretching spring 29, the roll support plate 28 pushes the delivery roll 27 towards the optical disk guiding device 7. If the optical disk is inserted along the middle of the delivery roll 27 and the optical disk guiding device 7, the roll support plate 28 will rotate under the state of resisting the second stretching spring 29, so as to make the optical disk capable of entering from between the delivery roll 27 and the optical disk guiding device 7. Moreover, the roll support plate 28 is provided with the third slide contact part 28a capable of cooperating with the third flange 40e of the cam unit 40. If the cam unit 40 rotates from the initial position, the third flange 40e will make the delivery roll 27 to depart from the optical disk guiding device 7 for a vast scale. The structure of the delivery roll 27 is a bipyramidal structure with the diameter gradually increasing from the middle to the two ends.

The lower base plate 3 is provided with a motor 30, and a decelerating mechanism which decelerates the motor 30 and transports the power to the delivery roll 27 and the cam unit 40. The decelerating mechanism comprises the belt pulley 32 decelerating and transporting the rotating of the motor via the belt 31, the first gear 33 decelerating the belt pulley 32 and transporting its power, the second gear 34 decelerating the first gear 33 and transporting its power, the third gear 35 transporting the rotating via the second gear 34, the worm gear 36 fixed to the plane of the lower base plate 3 and corresponding to the gear ring 40a of the cam unit 40, and the worm cooperating with the worm gear 36; the periphery of the worm gear 36 is provided with a gear ring cooperating with the gear ring 40a of the cam unit 40 to drive the cam unit 40 to rotate, and the second gear 34 is fixed at one end of the worm. The motor 30, the belt pulley 32 and the first gear 33 are fixed at the side of the lower base plate 3; the second gear 34 and the third gear 35 are fixed at the gear plate 37, and the gear plate 37 is fixed at the side of the lower base plate 3. The gear ring 40a of the cam unit 40 is provided with a gap 40b; when the cam unit 40 is located at the initial position, the gap 40b is opposite to the worm gear 36. The third gear 35 meshes with the roll gear 38; the roll gear 38 and the delivery roll 27 rotate as one body.

The cam unit 40 is fixed on the lower base plate 3 by way of rotating shaft support, and is capable of freely rotating. As shown in FIG. 8A and FIG. 8B, except the gear ring 40a and the gap 40b, the cam unit 40 is also provided with the first flange 40c, the second flange 40d and the third flange 40e; at the end face, the circular-arc groove 40f cooperating with the contact pin 21b of the trigger bar 21 is provided. The first flange 40c extrudes out of the periphery of the cam unit 40; the second flange 40d and the third flange 40e sink into the peripheral surface. Moreover, the periphery of the cam unit 40 is provided with the second salience 40h and the third salience 40g. Near the rotating end point of the cam, the second salience 40h and the third salience 40g have the possibility to contact the foot part 11d of the left detection bar 11. So, if a small diameter optical disk is inserted, the rotary displacement of the foot part 11d of the left detection bar 11 is comparatively small, and the second salience 40h will contact the foot part 11d. If a big diameter optical disk is inserted, the left detection bar 11 will rotate for a vast scale, and the third salience 40g will contact the foot part 11d. The situation that the second and the third salience 40h, 40g contact the foot part 11d occurs near the rotating end terminal of the cam unit 40; at the rotating end terminal of the cam unit 40, for the action of the second and the third salience 40h, 40g contacting the foot part 11d, the left detection bar 11 will rotate counterclockwise, so as to release the contact of the detection part 11a and the periphery of the optical disk. Moreover, at this time, the rotating of the left detection bar 11 is transported to the right detection bar 10 via the linkage plate 13, so as to release the contact of the detection part 10a of the right detection bar 10 and the periphery of the optical disk.

Figure 9:
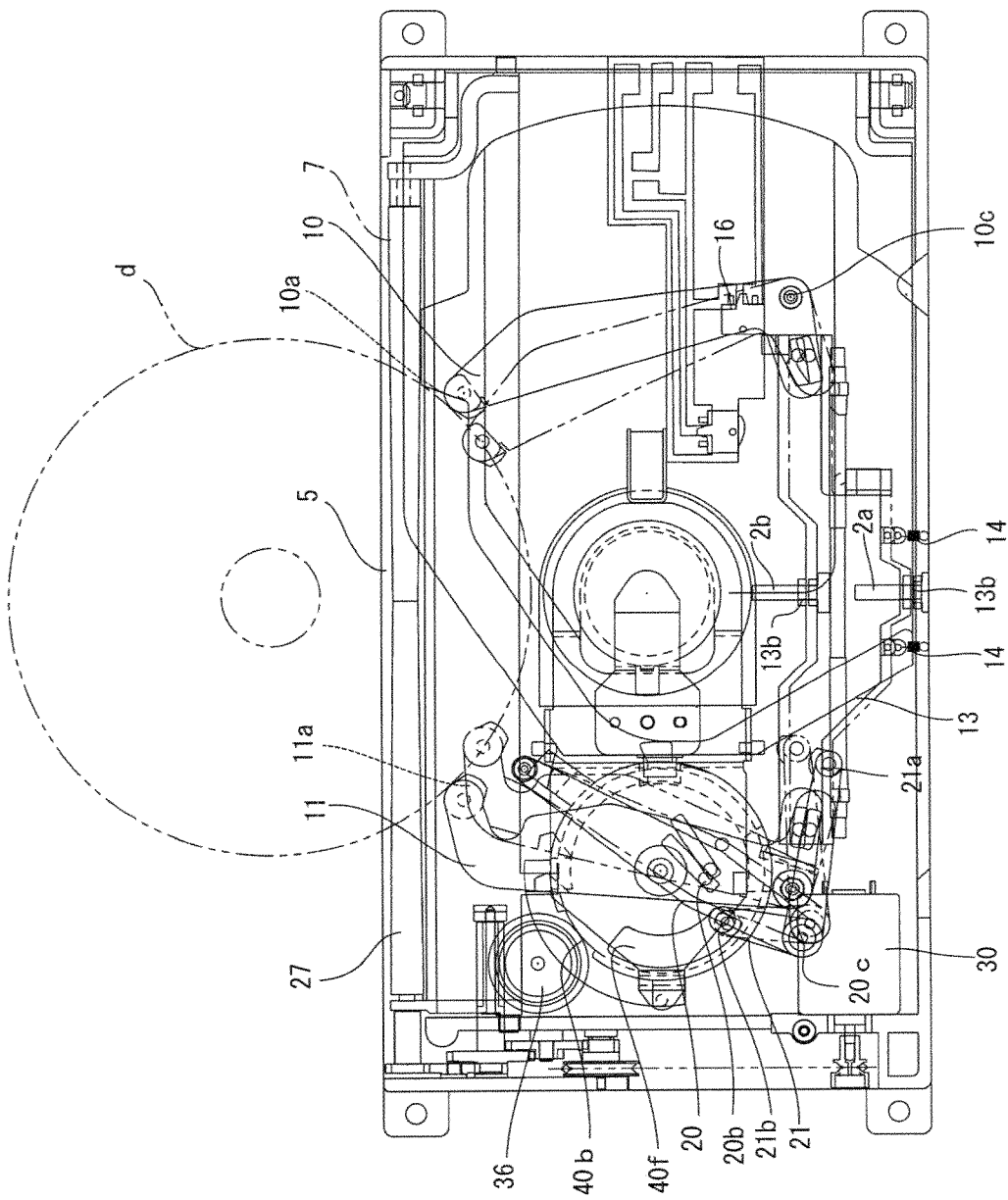
FIG. 9 is a state diagram of transporting a small diameter optical disk, which shows the state of the small diameter optical disk d being inserted from between the optical disk guiding device and the delivery roll of the insertion inlet.

Description to the Actions:

FIG. 9 shows the situation that the small diameter optical disk d resists the force of the second stretching spring 29, to be inserted from between the optical disk guiding device 7 and the delivery roll 27 of the insertion inlet 5. At this time, the periphery of the small diameter optical disk d pushes the detection parts 10a, 11a of the two detection bars 10, 11, so as to make the two detection bars to move from the position as shown with the imaginary line (broken line) to the position as shown with the real line. The rotating of the two detection bars 10, 11 makes the linkage plate 13 to move from the position as shown with the imaginary line (broken line) to upwards. The moving of the linkage plate 13 makes the first switch 16 to be closed, so as to start the motor 30. The motor 30 via the decelerating mechanism drives the delivery roll 27 to rotate, and the small diameter optical disk d is transported into the optical disk transport path 4 by the rotating of the delivery roll 27. At this time, the gap 40b of the cam unit and the worm gear 36 are located at corresponding positions, so, the rotating of the worm gear 36 will not make the cam unit 40 to rotate. Then, on the one hand, the small diameter optical disk d pushes the two detection bars 10, 11 to rotate; on the other hand, it is guided in to the optical disk transport path.

If the small diameter optical disk is not aimed to the central position of the optical disk insertion inlet 5 while it is inserted, one of the two detection bars 10, 11 will only rotate for a little, and the first switch 16 is closed, so, the small diameter optical disk d is transported into the optical disk transport path 4 by the rotating of the delivery roll 27. After that, for the contact of the step parts 2c and the embedding parts 13b, the rotating of one of the left, right detection bars 11, 10 is limited. So, the small diameter optical disk d will be guided by the detection part of the detection bar with the rotating being limited, via the rotating of the delivery roll 27, to be transported near the central line 1a into the optical disk transport path 4.

By the rotating of the left detection bar 11, the second slotted hole 11e via the assorted part 20b makes the support part 20 to rotate clockwise as shown in the figure. For the support part 20 is fixed according to the direction that makes the connecting line between the first short axis 20a and the second short axis 20c to be juxtaposed to the central line 1a, the trigger bar 21 that is supported by the rotating front end of the support part 20 will move along the direction directly facing the central line 1a. So, by the way of making the trigger bar 21 to move towards the direction directly facing the central line 1a, the dimension of the main unit of the optical disk playing device of the present invention at the optical disk transport direction can be effectively controlled.

Figure 10:
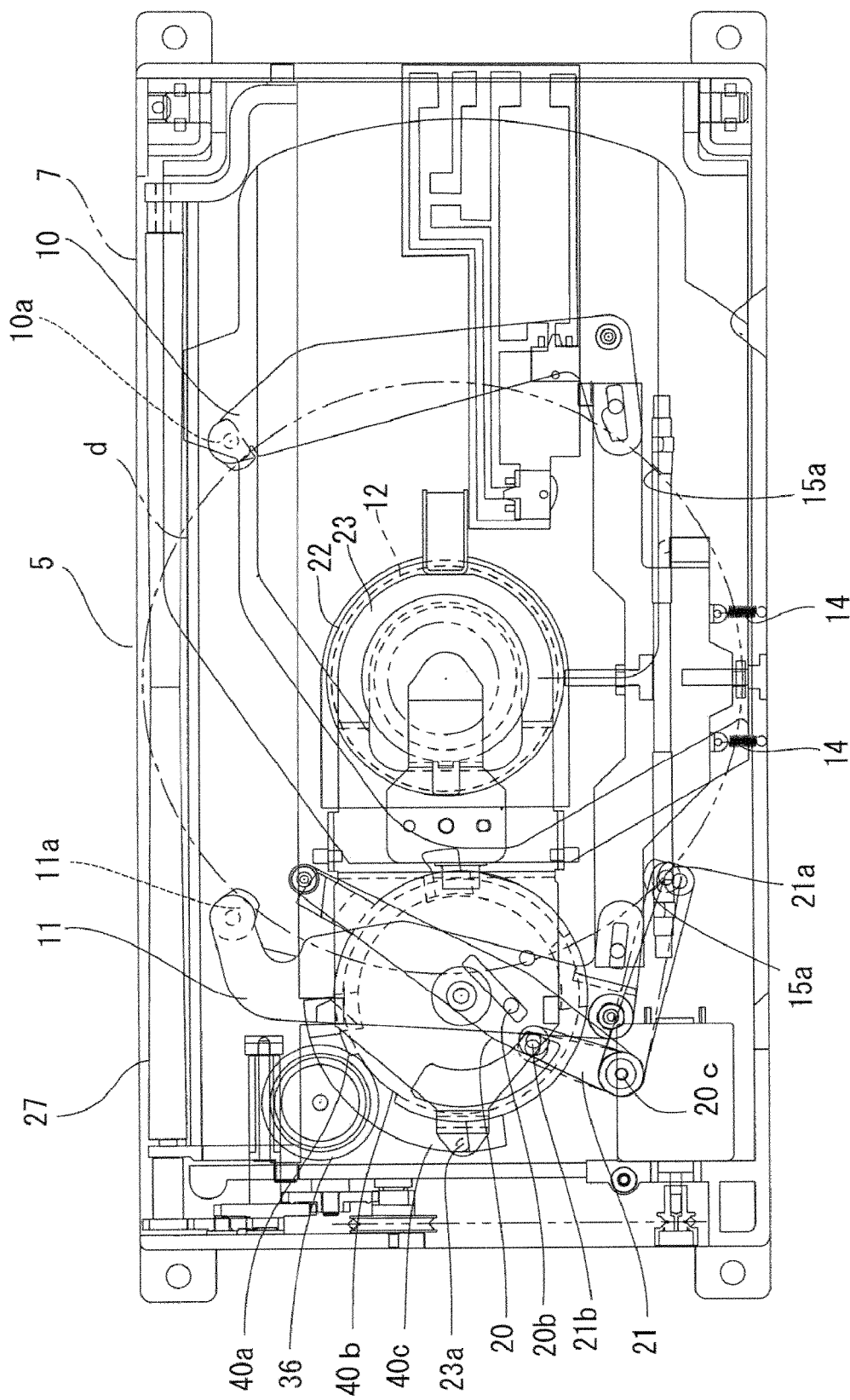
FIG. 10 is a state diagram of transporting a small diameter optical disk, which shows the state of the periphery of the small diameter optical disk d contacting the baffle part when the center of the small diameter optical disk d passes the center of the plummer a little.

FIG. 10 shows the situation that when the center of the small diameter optical disk d passes the center of the plummer 12 a little, the periphery of the small diameter optical disk d contacts the baffle part 15a. At this time, the contact part 21a of the trigger bar 21 is against the periphery of the small diameter optical disk d, and the contact pin 21b of the trigger bar 21 moves from the position of the imaginary line to the position as shown with the real line near the center. By the rotating of the trigger bar 21, the contact pin 21b of the trigger bar pushes the circular-arc groove 40f of the cam unit 40, so as to make the cam unit 40 to rotate counterclockwise. By the rotating of the cam unit 40, the gear ring 40a of the cam unit 40 meshes with the worm gear 36. The motor 30 via the worm gear 36 makes the cam unit 40 to rotate counterclockwise. By the rotating of the cam unit 40, the first flange 40c will via the hold plate 23 make the chuck plate 22 to approach the plummer 12. Then, the hold plate elastic slice 24 fixed to the hold plate 23 via the chuck plate 22 pushes the small diameter optical disk d towards the plummer 12.

On the other hand, the second flange 40d of the cam unit 40 via the second slide contact part 26b of the PU base plate 26 makes the PU base plate 26 to rotate around the shaft 26a. With this rotating, the PU base plate 26 raises the rotating mechanism 25, so as to make the plummer 12 to approach the small diameter optical disk. The plummer 12 and the chuck plate 22 together holds the small diameter optical disk, so as to make it possible to play the optical disk. On the plummer 12, a tapered salience 12a cooperating with the central hole of the optical disk is provided, and the tapered salience 12a is located at the position opposite to the chuck plate 22; after the central hole of the small diameter optical disk d is embedded to the salience 12a, the contact of the periphery of the small diameter optical disk and the baffle part 15a is released.

Furthermore, referring to FIG. 7, by the rotating of the cam unit, the third flange 40e of the cam unit 40 is under the situation of resisting the second stretching spring 29, to make the roll support plate 28 to rotate counterclockwise around the shaft 28b. By the roll support plate 28 rotating counterclockwise, the small diameter optical disk d and the delivery roll 27 together move towards the lower base plate 3, and the small diameter optical disk d is descended to the plummer 12. Then, by the roll support plate 28 rotating counterclockwise, the tapered delivery roll 27 departs from the small diameter optical disk d, so as to move to the position that will not hinder the rotating of the optical disk. On the other hand, since the small diameter optical disk descends to the plummer 12, it also departs from the optical disk guiding device 7.

Furthermore, when the cam unit 40 is at the counterclockwise rotating end terminal, the second salience 40h of the cam unit 40 contacts the foot part 11d of the left detection bar 11, so as to make the left detection bar 11 to rotate counterclockwise as shown in FIG. 10. By this rotating, the left detection bar 11 makes the detection part 11a to depart from the periphery of the small diameter optical disk. Besides, as shown in FIG. 10, via the linkage plate 13, the right detection bar 10 that moves together with the left detection bar 11 rotates clockwise, so as to make the detection part 10a to depart from the periphery of the small diameter optical disk. That is, after the small diameter optical disk d is inserted from the optical disk insertion inlet 5, it is transported to the plummer 12, and then it is held by the chuck plate 22; in this period, the detection parts 10a, 11a keep guiding the periphery of the optical disk. By this guiding, no matter what posture the optical disk playing device of the present invention is at, it can all transport the small diameter optical disk d to the plummer 12 safely. Besides, in the operation of getting the optical disk out, the above mentioned actions will be executed conversely. So, only after the small diameter optical disk d is held by the two detection parts 10a, 11a, the holding of the chuck plate 22 and the plummer 12 to the optical disk is released; even if the direction of the optical disk insertion inlet 5 is downward, the small diameter optical disk can still be prevented from dropping out of the optical disk insertion inlet 5.

Figure 11:
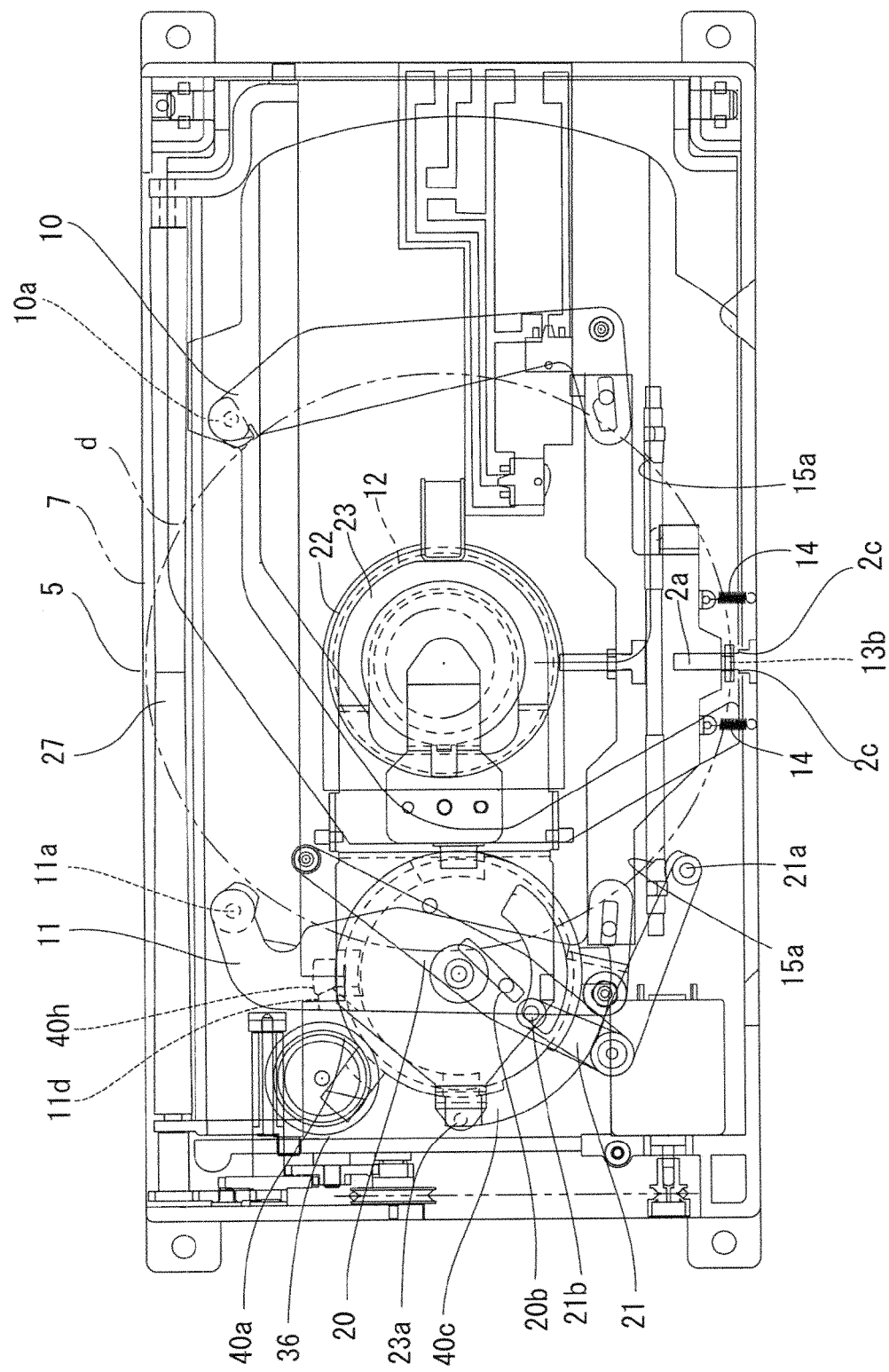
FIG. 11 is a state diagram of transporting a small diameter optical disk, which shows the state of the small diameter optical disk d being kept on the plummer to be in the state capable of being played.

FIG. 11 shows that the small diameter optical disk d is kept on the plummer 12 to be at the state capable of being played. At this time, the cam unit 40 is located at the end terminal position of the rotating; the detection parts 10a, 11a and the baffle part 15a are at the state of not contacting the periphery of the small diameter optical disk d; the optical disk guiding device 7 and the delivery roll 27 are also at the state of not contacting the surface of the optical disk. By the action of the second salience 40h of the cam unit 40, the left detection bar 11 endures a rotating force towards counterclockwise direction, and the linkage plate 13 only moves slightly. For the slightly moving of the linkage plate 13, the embedding parts 13b via the step parts 2c move towards the inner of the first guiding hole 2a. So, while getting the optical disk out, the small diameter optical disk d is transported out under the holding of the delivery roll 27 and the optical disk guiding device 7; for the embedding parts 13b don't contact the step parts 2c, the action of getting out is very smooth.

Figure 12:
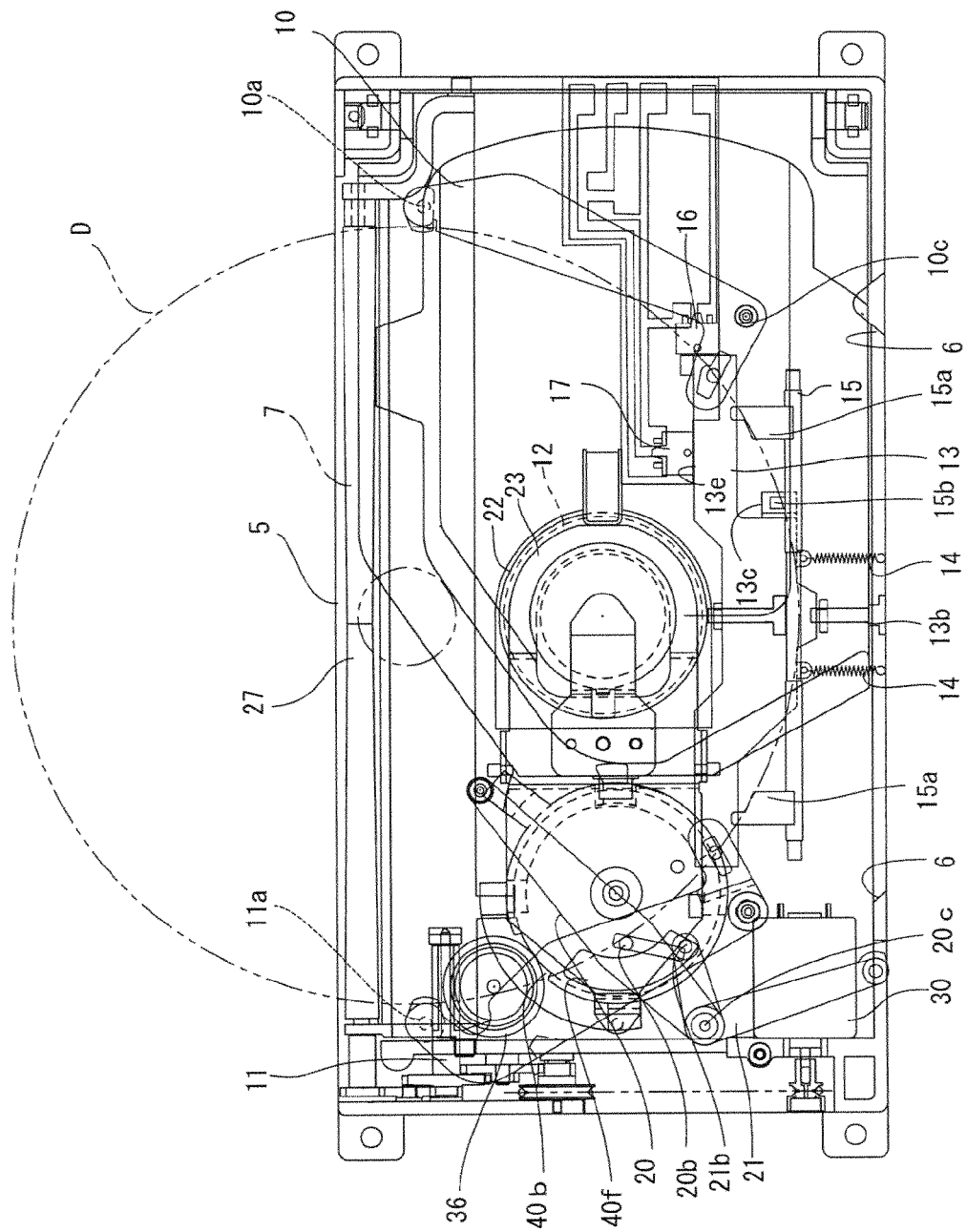
FIG. 12 is a state diagram of transporting a big diameter optical disk, which shows the state of the big diameter optical disk D being inserted from the insertion inlet, and the rotary displacement of the left and right detection bars getting to the maximum.

FIG. 12 shows the state that when the big diameter optical disk D is inserted from the insertion inlet, the rotary displacement of the two detection bars 10, 11 gets to the maximum. By the rotating of the left detection bar 11, the second slotted hole 11e via the assorted part 20b makes the support part 20 to rotate clockwise to the utmost as shown in the figure. The trigger bar 21 fixed to the rotating front end of the support part 20 moves towards the direction directly facing the central line 1a for the maximum range. So, for the trigger bar 21 moves towards the direction directly facing the central line 1a, even if the rotating of the left detection bar 11 gets to the utmost, the increasing of the dimension of the main unit 1 at the optical disk transport direction can still be restrained. During the course of the rotating of the two detection bars 10, 11 getting to the maximum range, the first pushing part 13c of the linkage plate 13 pushes the pushed part 15b of the optical disk baffle 15, as shown in FIG. 15, so as to make the baffle part 15a of the optical disk baffle 15 to exit from the optical disk transport path 4. So, the big diameter optical disk can be transported under the situation of not contacting the baffle part 15a of the optical disk baffle 15.

Figure 13:
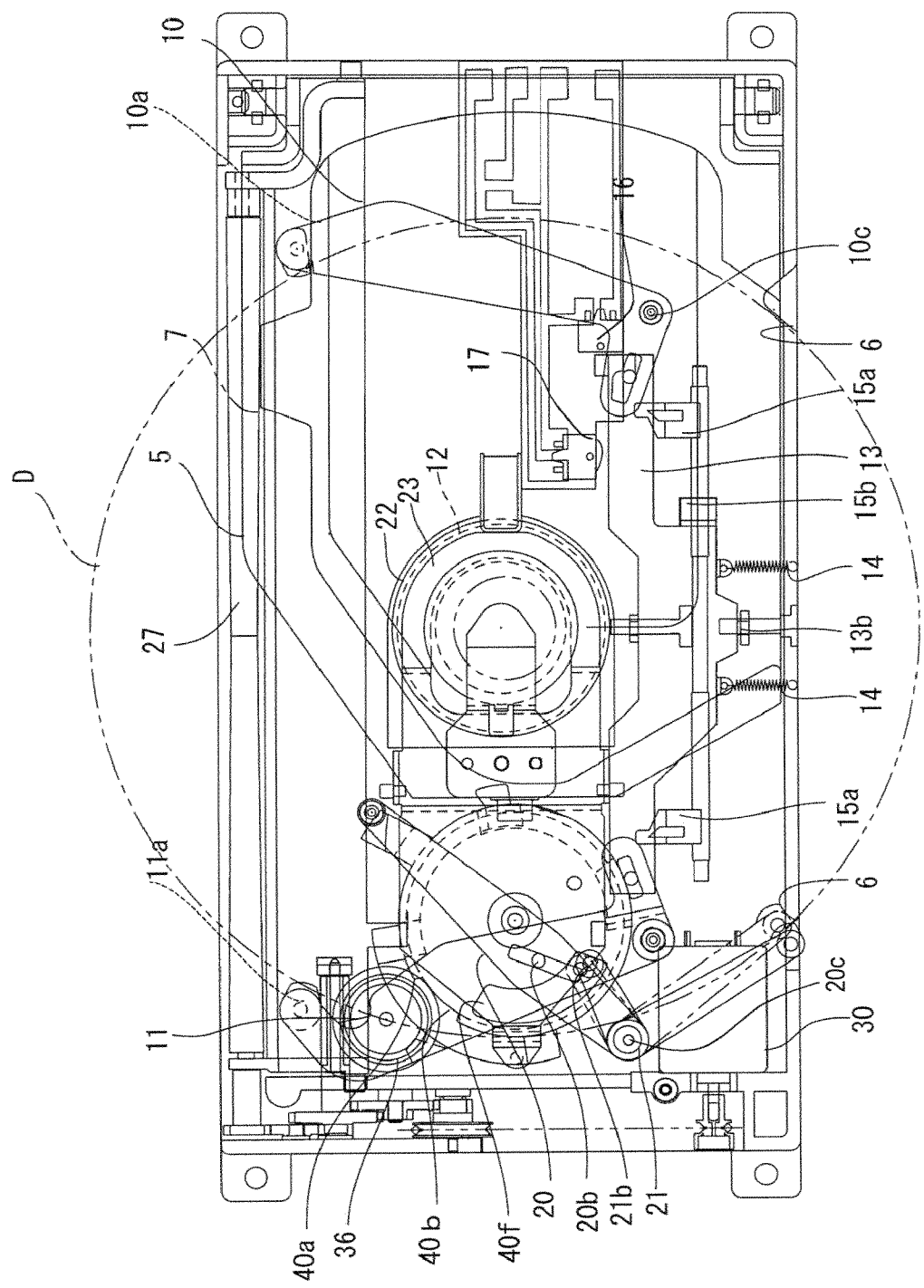
FIG. 13 is a state diagram of transporting a big diameter optical disk, which shows the state of the periphery of the big diameter optical disk D contacting the baffle 6 when the center of the big diameter optical disk is located at the position just passing the center of the plummer a little.

FIG. 13 shows the state that the big diameter optical disk D contacts the baffle 6 to stop the transport action; the center of the big diameter optical disk is located at the position just passing the center of the plummer a little; at this time, the contact part 21a of the trigger bar 21 is pushed towards the periphery of the big diameter optical disk D, and the trigger bar 21 will rotate around the second short axis 20c from the position of the imaginary line (broken line) to the position of the real line. By the rotating of the trigger bar 21, the contact pin 21b of the trigger bar 21 pushes the end face of the circular-arc groove 40f of the cam unit 40, so as to make the cam unit 40 to rotate counterclockwise. By the rotating of the cam unit 40, the gear ring 40a of the cam unit 40 meshes with the worm gear 36, so as to make the rotating of the motor 30 to be transported to the cam unit 40.

When the cam unit 40 is at the counterclockwise rotating end terminal, the third salience 40g contacts the foot part 11d of the left detection bar 11, so as to make the left detection bar 11 to rotate counterclockwise as shown in FIG. 13. By this rotating, the detection part 11a of the left detection bar 11 departs from the periphery of the big diameter optical disk D, then the optical disk D is kept on the plummer 12 by the chuck plate 22. For the big diameter optical disk D makes the two detection bars 10, 11 to rotate for a vast scale, the movement amount of the linkage plate 13 is also increased; the result is that the third pushing part 13e makes the second switch 17 to act to be at the connected state. After the second switch 17 is at the connected state, a signal will be sent out to show that the optical disk inserted is a big diameter optical disk.

Figure 14:
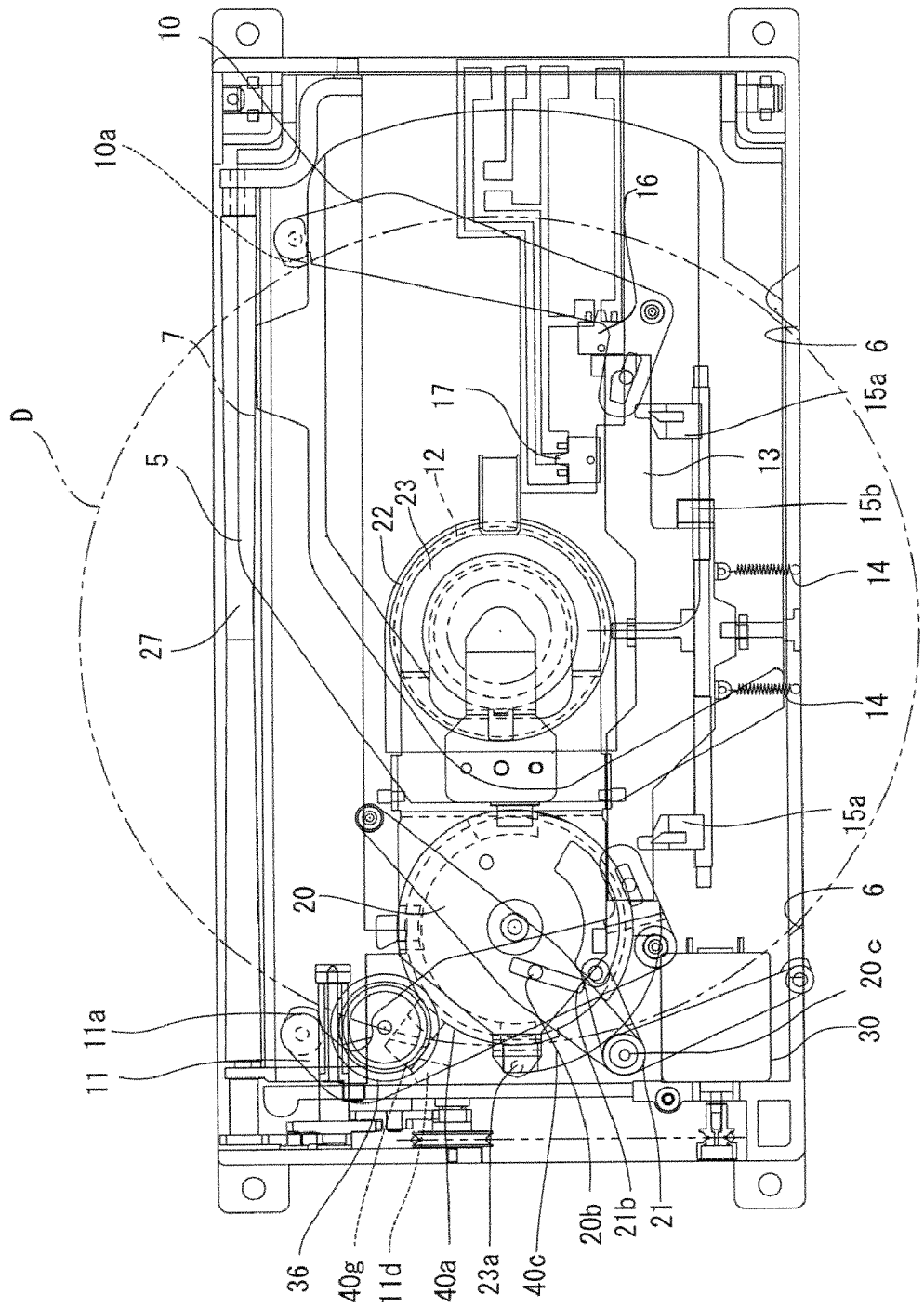
FIG. 14 is a state diagram of transporting a big diameter optical disk, which shows the state of the big diameter optical disk D being located on the plummer to be in the state capable of being played.

FIG. 14 shows that the big diameter optical disk D is located on the plummer 12 to be at the state capable of being played. At this time, the cam unit 40 is located at the end terminal position of the rotating; the two detection bars 10, 11 and the baffle 6 are at the state of not contacting the periphery of the big diameter optical disk D; besides, the optical disk guiding device 7 and the delivery roll 27 are also at the state of not contacting the surface of the optical disk, so the optical disk is possible to be played.

The present invention can be applied to optical disk playing devices, such as of CD, DVD.

What is claimed is:
1. An optical disk loading final position detection device comprising:
at least one optical disk guiding device (7) located at the optical disk insertion inlet (5);
a delivery roll (27) located at the optical disk insertion inlet (5) and located at the position opposite to the optical disk guiding device (7);
a pair of detection bars (10,11) provided with detection parts (10a,11a) contacting the periphery of the optical disk of big diameter or small diameter inserted from the optical disk insertion inlet (5), and the detection bars (10,11) being capable of freely rotating around respective rotary pivots;
characterized in that it further comprises:
a support part (20), one end of the support part (20) being rotatably fixed to the upper base plate (2) near the detection part (11a) of one detection bar (11), the middle of the support part (20) being provided with an assorted part (20b) interacting with the detection bar (11); and
a trigger bar (21), the middle of the trigger bar (21) being rotatably fixed to the free end of the support part (20), one end of the trigger bar (21) being provided with a contact part (21a) for contacting the periphery of an optical disk, and the other end being connected to a control part (40),
wherein the control part (40) is a cam unit capable of rotating freely around its shaft, and the cam unit is provided with:
a gear ring (40a) located at an edge position of the periphery of the cam unit, the gear ring (40a) being provided with a gap (40b);
a circular-arc groove (40f) located at the end part of the cam unit, being used to connect the trigger bar (21);
a second salience (40h) located at the periphery of the cam unit, being used to stir the detection bars (10,11) to rotate to release the contact of the detection parts (10a,11a) and the periphery of a small diameter optical disk; and
a third salience (40a) located at the periphery of the cam unit, being used to stir the detection bars (10,11) to rotate to release the contact of the detection parts (10a,11a) and the periphery of a big diameter optical disk.

2. The optical disk loading final position detection device of claim 1, wherein the trigger bar (21) is a part of L shape, and its curved part is fixed to the free end of the support part (20).

3. The optical disk loading final position detection device of claim 1, wherein at the initial state, the position where the support part (20) locates on the upper base plate (2) approximately coincides with the position where the detection bar (11) cooperating with the support part (20) locates on the upper base plate (2).

4. The optical disk loading final position detection device of claim 1, wherein the assorted part (20b) of the support part (20) is a salient point; the corresponding detection bar (11) is provided with a slotted hole (11e); the salient point is embedded in the slotted hole (11e) and can move in the slotted hole (11e).

5. The optical disk loading final position detection device of claim 1, wherein the periphery of the cam unit is also provided with a first flange (40c) for controlling a chuck plate (22) to approach or be away from the optical disk transport path, a second flange (40d) for controlling a plummer (12) to approach or be away from the optical disk transport path, and a third flange (40e) for controlling the delivery roll (27) to approach or be away from the optical disk guiding device (7).

* * * * *

UNITED STATES PATENT AND TRADEMARK OFFICE
CERTIFICATE OF CORRECTION

| | | |
|---|---|---|
| PATENT NO. | : 8,099,742 B2 | Page 1 of 1 |
| APPLICATION NO. | : 12/422008 | |
| DATED | : January 17, 2012 | |
| INVENTOR(S) | : Yung Ta Chen | |

It is certified that error appears in the above-identified patent and that said Letters Patent is hereby corrected as shown below:

Title page, Item (73) Assignee, on line 8, below Inventor, the following assignee name should be inserted:

-- VALLEY WOOD ELECTRICAL (SHENZHEN) CO. LTD., SHENZHEN, GUANGDONG, CHINA --

Signed and Sealed this
Seventeenth Day of July, 2012

David J. Kappos
*Director of the United States Patent and Trademark Office*